United States Patent

Downey

[11] 3,798,924
[45] Mar. 26, 1974

[54] SHAFT COUPLING AND ELEMENT THEREFOR

[75] Inventor: Holmes A. Downey, Bremen, Ind.
[73] Assignee: Reliance Electric Company, Mishawaka, Ind.
[22] Filed: Oct. 27, 1972
[21] Appl. No.: 301,355

[52] U.S. Cl. .................... 64/13, 64/14, 64/27 NM
[51] Int. Cl. ............................................. F16d 3/78
[58] Field of Search ......... 64/13, 11, 12, 27 NM, 14

[56] References Cited
UNITED STATES PATENTS
3,316,737  5/1967  Hulley ..................................... 64/13
2,708,352  5/1955  Boschi ................................... 64/14
2,702,087  2/1955  Beier ............................. 64/27 NM Primary Examiner—Benjamin W. Wyche
Assistant Examiner—Randall Heald
Attorney, Agent, or Firm—Marmaduke A. Hobbs, Hobbs & Green

[57] ABSTRACT

A flexible coupling for connecting two shafts in end to end relation in which there are flanges for each of the shafts, a plurality of spaced pins secured in each of said flanges and projecting alternately toward the other flange, and a flexible element of elastomeric material disposed between the flanges and having holes for receiving and gripping the pins of each of the two flanges in a snug fit. The flexible element, which is preferably constructed of polyurethane, is thinner in the area on the radial sides of each of the holes for the pins than in the area between them to provide good element flexibility and to give optimum performance of the coupling when connecting misaligned shafts. Spacer protrusions are provided on opposite sides of the element for positioning the element between the two flanges.

14 Claims, 6 Drawing Figures

PATENTED MAR 26 1974

SHAFT COUPLING AND ELEMENT THEREFOR

A common type of coupling for connecting two rotating shafts in end to end relation consists of a pair of flanges for the shafts with alternate pins extending lengthwise of the shafts, and a flexible disc disposed between the flanges and containing holes for receiving the alternately positioned pins. In the past the flexible discs were made of fiber reinforced rubber material and were sufficiently flexible and the parts fitting sufficiently loosely to permit acceptable operation of the two shafts even though they may have had appreciable shaft misalignment. These prior discs initially did not fit tight on the pins, and hence substantial wear, principally by rubbing and abrasion, occurred on the pins and in the element holes, which accelerated as the wear progressed so that replacement of the element, the pins or entire coupling often became necessary in a relatively short period of time. With the occurrence of wear on the pins and in the holes of the element, consistent operation and dependable performance of the coupling were not possible over long periods of time.

An elastomeric disc has been used in place of the foregoing flexible discs and one such type is disclosed and claimed in my copending application Ser. No. 195,570 filed Nov. 4, 1971. In the type disclosed in my prior application the pins of the two flanges fit snugly in the holes of the disc, and the flexure required in the operation of misaligned shafts takes place between the holes, primarily in spaced relation thereto. The prior element performs satisfactorily in the smaller or medium sized shaft coupling; however, larger elements of that design have insufficient flexibility to give optimum performance over an extended period of time. It is one of the principal objects of the present invention to provide a shaft coupling having a pair of flanges with alternately arranged pins and an element disposed between the flanges for holding the pins and flanges in a predetermined relationship, yet, even in the larger and heavier couplings, providing sufficient flexibility in the coupling to permit it to adjust effectively and efficiently to all normal misalignments between the shafts connected thereby.

Another object of the invention is to provide a coupling of the aforementioned type which contains an element so designed and constructed that little or no rubbing action, abrasion or wear takes place between the pins and the element, and friction and wear are reduced to a minimum.

Still another object of the invention is to provide an element for a flexible coupling which can be readily tailored to any particular installation, and which has better performance and longer life than the present fiber reinforced rubber elements, and which gives optimum flexibility to the coupling without producing any significant friction or wear in the various operating parts.

A further object is to provide an element for a flexible coupling which is simple in construction and operation, and which can readily and consistently be fabricated using standard know-how and equipment.

The present invention involves a flexible coupling element of elastomeric material such as polyurethane, designed to utilize the elastomeric properties of flexure and the elastic characteristics unique to these materials under tensile and compression forces, and capable of transmitting a torsional moment and simultaneously accepting distortion or system misalignment of the coupling without relative surface movement of the coupling parts with respect to one another. Wear of the coupling's parts is negligible and degradation is confined to the internal structure of the flexible element. The torque transmission through the coupling is accomplished by axially arranged pins disposed in a circle and projecting from the face of the shaft flanges attached rigidly to the shaft. The pins alternatingly engage the elastomeric element which fits snugly over each pin. Application of a torsional moment to one shaft causes rotation of the rigidly attached flange and thus causes the axially disposed pins to bear on the element material. By virtue of the imposed compression and tension forces created in the element, the alternately disposed pins of the opposite flange are driven, and the torque consequently imposed on the driven shaft through the opposite flange.

In the present invention the coupling element has a reduced section in the proximity of each pin hole which, together with the snug fitting pin and element relationship, causes or permits a rolling action of the compressed elastomeric material and permits a relatively high axial deflection of the disc without encountering the wear normally encountered in the conventional element. This design operates effectively and efficiently over a wide range of sizes.

An additional feature of the present elastomeric element is the axial projections from the faces of the element. The action of these projections during coupling operation prevents axial travel of the element on the flange pins, thereby maintaining the element in the geometric center of the coupling even during asymmetric misalignments. Maintaining the central location prevents the element from working against the face of either flange and restricting the freedom of movement of the elastomer. Should the elastomer not be free to flex and follow the movement of the pins, a sliding action is generated between the element and pins which wears the elastomeric material and reduces or eliminates the action of retention of the element on the pin, permitting sliding friction wear to eventually destroy the usefulness of the coupling. An added advantage of the projections is their function during coupling installation, in that the coupling flanges may be brought together until they touch the projections, thus eliminating any requirement for further axial measurements.

The invention will be more fully understood and additional objects and advantages will become apparent from the following description and accompanying drawings, wherein.

Figure 1:
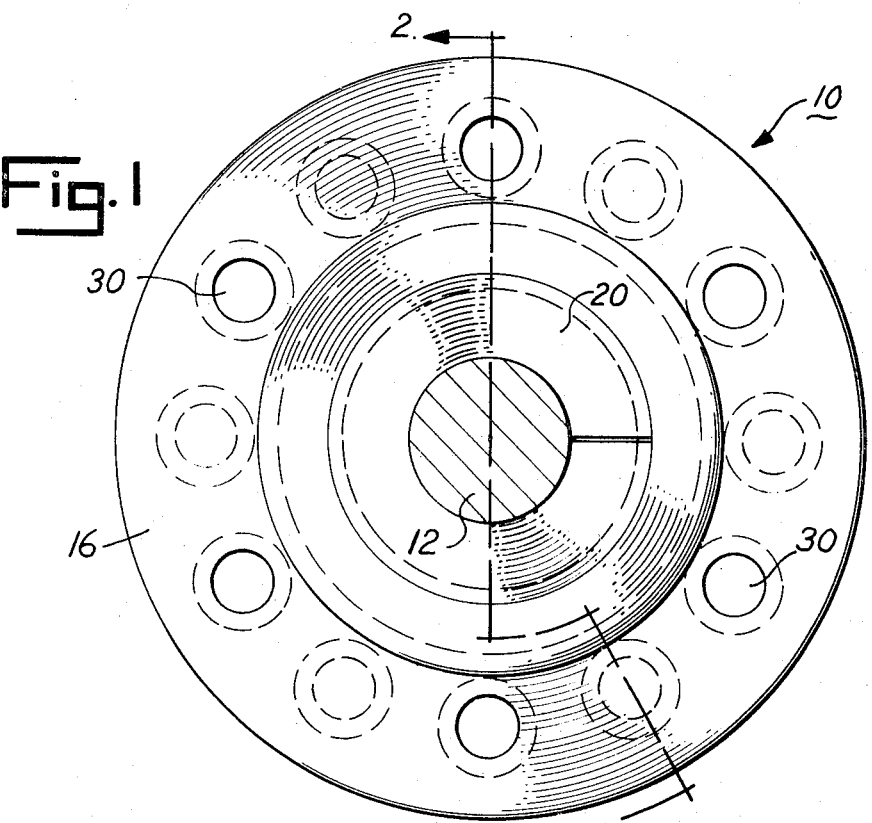
FIG. 1 is an end elevational view of a coupling embodying the present invention.
Figure 2:
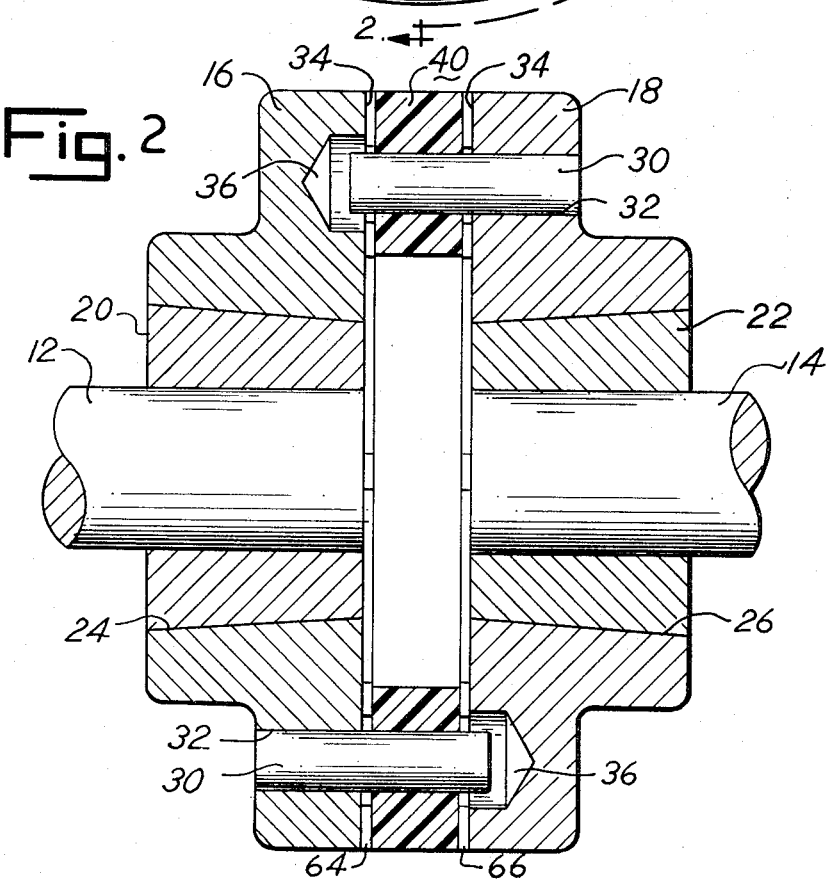
FIG. 2 is a cross-sectional view of the coupling shown in FIG. 1, the section being taken on line 2—2 of FIG. 1.

Referring more specifically to the drawings, numeral 10 indicates generally a coupling embodying the present invention, showing the coupling mounted on two axially aligned, rotatable shafts 12 and 14. Various means of securing the coupling to the shaft may be used, so long as the coupling is held rigidly in place on the two shafts for rotation therewith. In the embodiment shown, the coupling includes flanges 16 and 18, each flange being secured to the respective shafts 12 and 14 by split tapered bushings 20 and 22, respectively, seated in tapered bores 24 and 26. Screws of a well-known relationship with the flanges force the bushings into the tapered bores, thereby contracting the split bushings around the shafts and holding the flanges firmly thereon; however, other types of flange securing means may be used if desired.

The flanges contain alternately positioned pins 30 rigidly secured in bores 32 of the respective flange, and projecting axially parallel from the inner face 34 of each flange into a recess 36 of somewhat larger size than the diameter of the pin in the other flange. Each of the two flanges contains six equally spaced pins 30, and since the ends of the pins extend into the recesses 36, the pins of the flange on the driving shaft are capable of driving the flange on the driven shaft by engagement of the ends of the pins with the sides of the respective recesses 36, thus providing a positive mechanical connection between the two flanges in the event they are subjected to excessive amount of torque, or in the event the torsion element fails or is severely damaged. The recesses 36 also permit sufficient movement between the two flanges that the flexible element can perform normally without interference between the pins of one flange and the opposed flange.

The torsional element, which is indicated generally by numeral 40, consists of an elastomeric body 42, of a suitable plastic material preferably of polyurethane, having sufficient flexibility to permit the element to adapt to parallel and angular misalignment of the two shafts. The body of the flexible element contains a plurality of holes 44, and before the element is assembled, the holes 44 are somewhat smaller in diameter than the pins, so that expansion of the body material surrounding the holes is required in assembling the element on the pins, thereby causing the sides of the holes to grip firmly the pins and prevent any appreciable relative movement therebetween.

Figure 3:
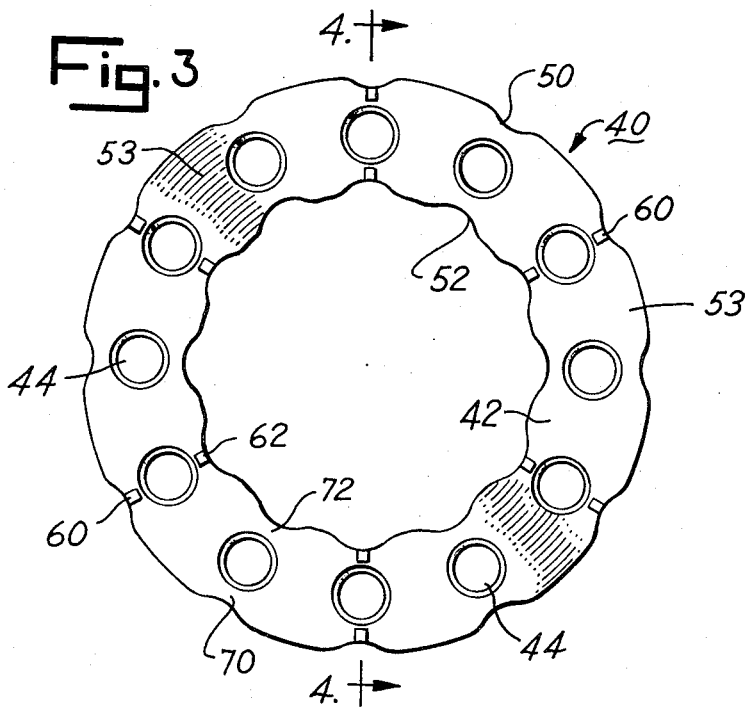
FIG. 3 is a side elevational view of the elastomeric element used in the coupling of FIGS. 1 and 2.
Figure 4:
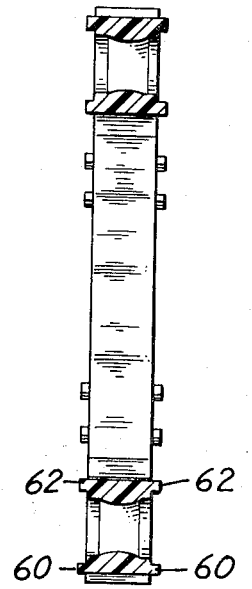
FIG. 4 is a cross-sectional view of the element taken on line 4—4 of FIG. 3.

During parallel and angular misalignment there is deflection of the disc, both radially and circumferentially, which creates a stress within the disc. This adverse effect is most pronounced in the larger couplings. In order to obtain a reduction in the stresses to acceptable limits, the point of yield in the element is controlled by the reduction in thickness adjacent the pin holes so that the disc is substantially more flexible near the holes than in the area between the holes. In the embodiment of the invention illustrated in FIGS. 3 and 4, the increased flexure of the element adjacent the holes is obtained by recesses 50 and 52 in the outer and inner peripheries of the element. The recesses extend inwardly to form the narrowest point of the element on a radial line intersecting the center of each hole. The side walls then flare outwardly so that the area between the holes forms the widest part of the element. This combination, with the tight fitting pin relationship in the holes, permits the element to adjust to the stresses of parallel and angular misalignment without causing any significant wear in the coupling parts, and permits the coupling to adjust effectively to operating conditions and to give optimum performance over an extended period of time. The compression accompanying substantial misalignment is effectively absorbed by the body of the element, particularly in the portion 53 near the center of the element between the holes.

Figure 5:
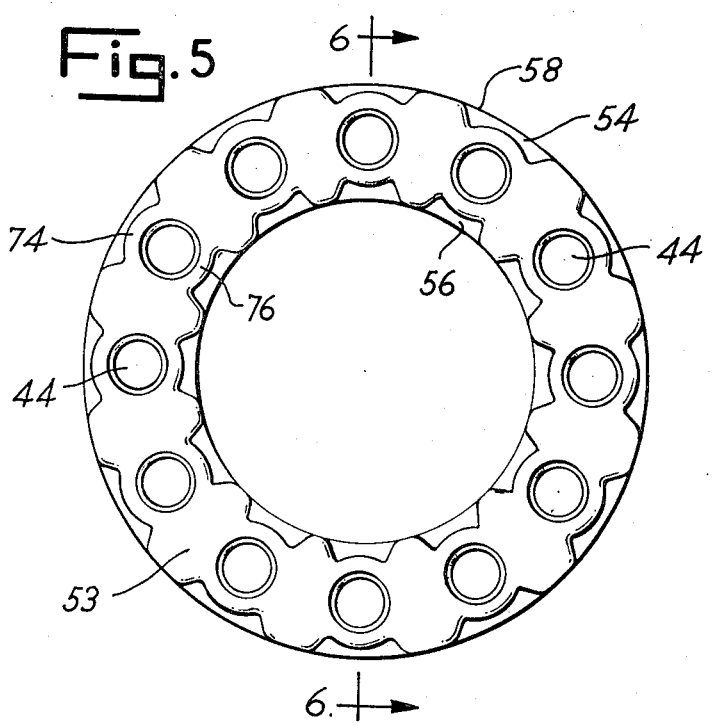
FIG. 5 is a side elevational view of a modified form of an element embodying the present invention.
Figure 6:
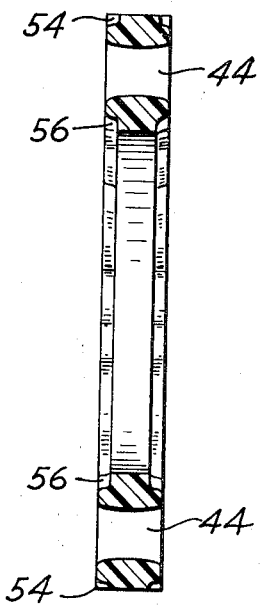
FIG. 6 is a cross-sectional view of the element shown in FIG. 5, the section being taken on line 6—6 of the latter figure.

A modified form of the element is illustrated in FIGS. 5 and 6 wherein recesses 54 and 56 are provided in opposite sides of the element, both on the external and internal sides of the holes. A web indicated by numeral 58 at each hole forms a continuous uniform curvature to the periphery of the element near the center thereof. The recesses, in the embodiments of both FIGS. 3 and 5, may be varied by increasing the depth and extent to obtain the desired flexibility of the element and capability thereof to adjust to the stresses of parallel and angular misalignment. Other configurations of the recesses adjacent the holes may be used in order to obtain various effects in the response of the element to the aforementioned stresses; however, those illustrated in the two embodiments represent preferred configurations. The element of FIG. 5 is otherwise similar to the element of FIG. 3, i.e., the holes are of such a diameter that the sides thereof grip the pins of the flanges and the body of the element is constructed of plastic such as polyurethane or other suitable elastomeric material. Like numerals are therefore given to like parts in the two embodiments.

In order to assure adequate clearance between the two flanges 16 and 18 and element 40 during the operation of the coupling, and to assist in assembling the flanges on the two shafts in proper relationship to one another, the element 40 contains on each side a plurality of pin-like projections 60 and 62 extending outwardly from the body 42, at the inner and outer edges thereof, preferably adjacent every other hole. The projections are formed integrally with the body and are disposed at corresponding points on opposite sides of the element. When the coupling is assembled on the shafts, the two flanges are positioned with the inner face 34 thereof seated against the outer end of projections 60 and 62, thereby providing the desired spacing 64 and 66 between flanges 16 and 18 and the respective sides of element 40. Adequate space for flexing of the element without interference from the flanges is assured, and the required space is consistently obtained from one installation to another by the projections in the manner described. Projections 60 and 62 are normally provided on the element of the modified form illustrated in FIG. 5, and the function performed by the projections in connection with the latter element is the same as that performed thereby in connection with the element shown in FIG. 3.

In the use and operation of the shaft coupling involving the present invention, the two flanges 16 and 18 are mounted on shafts 12 and 14 and element 40 is inserted therebetween with the pins of each flange being forced through holes 44 in the element. Since the holes are somewhat smaller than the pins, substantial force is required to assemble the element between the flanges. The flanges are pressed toward one another until the inner face 34 of each flange abuts against the ends of projections 60 and 62, thus providing the desired spaces 64 and 66 between the two flanges and the element. With the element assembled on the shafts 12 and 14 in the foregoing manner, the flanges are secured firmly in place. When the flanges are spaced from one another by the element and the projections thereon, the ends of pins 30 extend into recesses 36. As the coupling operates, the driving shaft 12, for example, transmits torque through flange 16 to the six alternately spaced pins in the flange to element 40, which in turn transmits the force therefrom to the six pins 30 in flange 18 and thence to driven shaft 14. The stresses of parallel or angular misalignment between the shafts are effectively absorbed by the element, particularly by the relatively thick portions 53, while the twisting action is concentrated in the relatively thin portions 70 and 72 of the element of FIG. 3 and portions 74 and 76 of the element of FIG. 5, which are capable of substantial flexing without causing any relative movement between the element and pins. These thin portions can be varied in thickness to provide the desired characteristic in a coupling for any normal operating condition.

The snug and gripping fit between pins 30 and holes 44 virtually eliminates any rubbing and abrasive action between the pins and the coupling, thereby substantially increasing the life of both the element and the pins, and hence extending the life of the principal coupling parts. In the event the element 40 fails, the coupling may continue to operate effectively for a period of time by the interlocking relationship of the ends of pins 30 and the walls of recesses 36. The size of the recesses with relation to the pins also determines the maximum deflection which may occur between flanges 16 and 18 and the flexible element 40.

While only two embodiments of the present shaft coupling and element therefor have been described in detail herein, various changes and modifications may be made without departing from the scope of the invention.

I claim:

1. A flexible coupling for connecting two shafts in an end to end relation, said coupling comprising a flange for each of said shafts, a plurality of spaced pins secured in each of said flanges and projecting toward the other flange, and an annular flexible element of continuous elastomeric material disposed between said flanges and having holes for receiving the pins of each of said flanges, said element having opposite radial sides and inner and outer peripheral sides, and recesses disposed in at least one of said sides in close proximity to said holes and extending inwardly toward the center of the respective holes, to provide sections of reduced thickness in said element adjacent said holes.

2. A flexible coupling as defined in claim 1 in which the holes in said element are initially smaller in diameter than the diameter of said pins to cause the walls defining the holes in said element to grip firmly the sides of the respective pins.

3. A flexible coupling as defined in claim 1 in which a recess is disposed in each peripheral side radially outwardly and inwardly from each of said holes to provide said areas with relatively greater flexibility than the areas between said holes.

4. A flexible coupling as defined in claim 2 in which a recess is disposed in each peripheral side radially outwardly and inwardly from each of said holes to provide said areas with relatively greater flexibility than the areas between said holes.

5. A flexible coupling as defined in claim 1 in which said elastomeric material is polyurethane.

6. A flexible coupling as defined in claim 4 in which said elastomeric material is polyurethane.

7. A flexible coupling as defined in claim 1 in which projections are provided on opposite sides of said element for spacing said element from the two flanges.

8. A flexible coupling as defined in claim 4 in which projections are provided on opposite sides of said element for spacing said element from the two flanges.

9. A flexible coupling as defined in claim 1 in which the pins of one of said flanges are positioned alternately with respect to the pins of the other flange.

10. A flexible coupling as defined in claim 9 in which the other of said flanges contains a recess for loosely receiving the end of the respective pin which projects thereinto.

11. A flexible element for a coupling having two flanges with a plurality of axially parallel pins for connecting two shafts in end to end relation, said element comprising a flexible annular body composed of continuous elastomeric material and having a plurality of spaced holes therein for receiving the pins of both of the flanges, said holes being initially smaller than the pins so that the material surrounding the holes will grip the pins when the element is assembled thereon, and having opposite radial sides and inner and outer peripheral sides, and recesses disposed in at least one of said sides in close proximity to said holes and extending inwardly toward the center of the respective holes, to provide sections of reduced thickness in said element adjacent said holes.

12. A flexible coupling as defined in claim 11 in which a recess is disposed in each peripheral side radially outwardly and inwardly from each of said holes to provide said areas with relatively greater flexibility than the area between said holes.

13. A flexible element for a shaft coupling as defined in claim 11 in which said elastomeric material is polyurethane.

14. A flexible element for a shaft coupling as defined in claim 11 in which projections are provided on opposite sides of said element for spacing said element from the two flanges.

* * * * *